US005560627A

United States Patent [19]

Zatulovsky et al.

[11] Patent Number: 5,560,627

[45] Date of Patent: Oct. 1, 1996

[54] LOW COST WHEELCHAIR

[75] Inventors: Leonid Zatulovsky, Northridge; Curtis A. Robinson, Sr., Simi Valley; Robert W. Renolds, Jr., Camarillo; Robert Dingley, Reseda; David St. George, No. Hollywood, all of Calif.

[73] Assignee: Guardian Products, Inc., Simi Valley, Calif.

[21] Appl. No.: 152,514

[22] Filed: Nov. 16, 1993

[51] Int. Cl.$^{6}$ .................................................. B62B 3/02

[52] U.S. Cl. ............................ 280/42; 280/647; 280/657

[58] Field of Search ............................ 280/657, 39, 647, 280/649, 650, 658, 42

[56] References Cited

U.S. PATENT DOCUMENTS

| | | | |
|---|---|---|---|
| D. 282,453 | 2/1986 | DiVito | D12/131 |
| 2,460,459 | 2/1949 | Kraska | 155/140 |
| 2,561,616 | 7/1951 | Everest et al. | 155/30 |
| 2,601,379 | 6/1952 | Everest et al. | 155/30 |
| 2,914,111 | 11/1959 | Mize | 155/28 |
| 2,930,429 | 3/1960 | Mize | 155/30 |
| 3,301,595 | 1/1967 | Jennings | 297/437 |
| 3,376,944 | 4/1968 | Lotz | 180/6.5 |
| 3,389,934 | 6/1968 | Sully | 297/42 |
| 3,814,477 | 6/1974 | Mattsson | 297/419 |
| 3,854,774 | 12/1974 | Limpach | 297/429 |
| 3,857,606 | 12/1974 | Rodaway | 297/429 |
| 3,865,434 | 2/1975 | Sully | 297/417 |
| 3,876,041 | 4/1975 | Pivacek | 188/1 D |
| 3,881,773 | 5/1975 | Rodaway | 297/377 |
| 3,883,175 | 5/1975 | Rodaway | 297/416 |
| 3,897,857 | 8/1975 | Rodaway | 188/2 F |
| 3,917,312 | 11/1975 | Rodaway | 280/242 WC |
| 3,987,507 | 10/1976 | Hall | 5/338 |
| 3,990,744 | 11/1976 | Rodaway | 297/433 |
| 3,990,745 | 11/1976 | Rodaway | 297/444 |
| 3,993,351 | 11/1976 | Rodaway | 297/422 |
| 4,042,250 | 8/1977 | Rodaway | 280/42 |
| 4,082,348 | 4/1978 | Haury | 297/45 |
| 4,083,598 | 4/1978 | Thomas | 297/45 |
| 4,140,341 | 2/1979 | Rabe | 297/45 |
| 4,164,354 | 8/1979 | Rodaway | 280/42 |
| 4,176,879 | 12/1979 | Rodaway | 297/429 |
| 4,227,742 | 10/1980 | Thomas | 297/430 |
| 4,319,381 | 3/1982 | Rodaway | 16/44 |
| 4,385,769 | 5/1983 | Molino | 280/47.38 |
| 4,424,873 | 1/1984 | Terlaak | 180/65 E |
| 4,489,980 | 12/1984 | Friedrich | 297/411 |
| 4,500,102 | 2/1985 | Haury et al. | 280/242 WC |
| 4,555,121 | 11/1985 | Lockard et al. | 280/30 |
| 4,560,200 | 12/1985 | Giannelli et al. | 280/30 |
| 4,595,212 | 6/1986 | Haury et al. | 280/242 WC |
| 4,678,233 | 7/1987 | Chabrol et al. | 297/429 |
| 4,770,467 | 9/1988 | Zinn | 297/429 |
| 4,790,553 | 12/1988 | Okamoto | 280/242 WC |
| 4,805,925 | 2/1989 | Haury et al. | 280/250.1 |
| 4,813,693 | 3/1989 | Lockard et al. | 280/42 |
| 4,834,413 | 5/1989 | Patel et al. | 280/304.1 |
| 4,840,390 | 6/1989 | Lockard et al. | 280/250.1 |
| 4,861,056 | 8/1989 | Duffy, Jr. et al. | 280/250.1 |
| 4,887,830 | 12/1989 | Fought et al. | 280/304.1 |
| 4,893,827 | 1/1990 | Gay et al. | 280/250.1 |
| 4,902,029 | 2/1990 | Gain et al. | 280/304.1 |
| 4,925,242 | 5/1990 | Harris et al. | 297/284 |
| 4,988,114 | 1/1991 | Thornton, Jr. et al. | 280/304.1 |
| 5,028,064 | 7/1991 | Johnson | 280/250.1 |
| 5,141,250 | 8/1992 | Morgan et al. | 280/250.1 |
| 5,154,438 | 10/1992 | Barclay | 280/250.1 |

FOREIGN PATENT DOCUMENTS

| | | |
|---|---|---|
| 1122984 | 8/1968 | United Kingdom . |

*Primary Examiner*—Richard M. Camby

*Attorney, Agent, or Firm*—Brinks Hofer Gilson & Lione

[57] ABSTRACT

A low-cost wheelchair that is formed from side members made from continuous, bent single pieces of tubing that is formed to create a loop, and crimped at the juncture where the loop is formed. An axle is mounted at the juncture of each loop, and a large rear wheel is mounted on each axle.

28 Claims, 7 Drawing Sheets

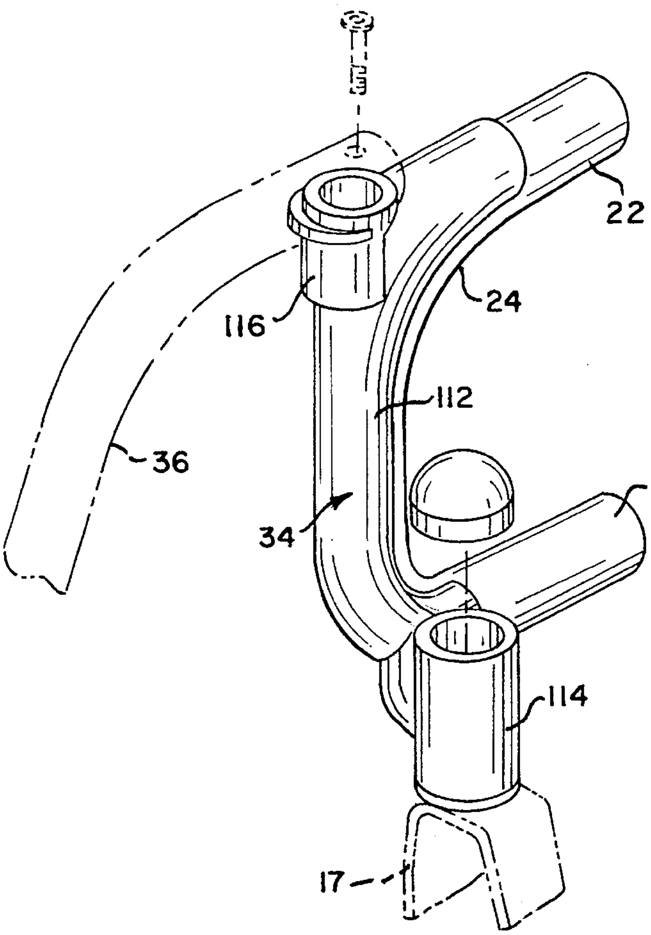
FIG. 8
FIG. 13
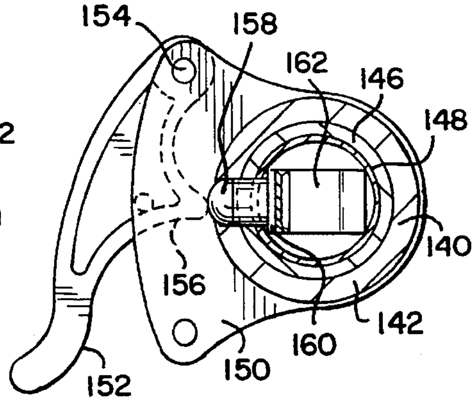
FIG. 12
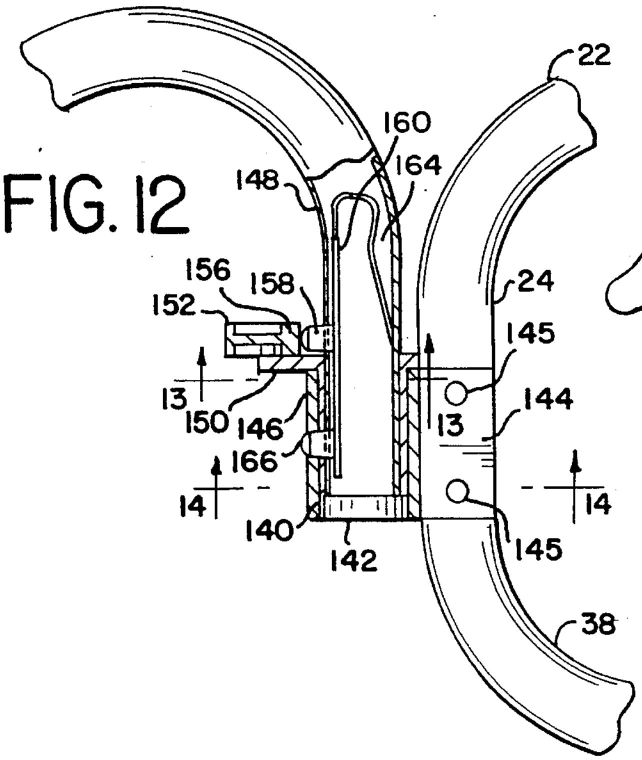
FIG. 14
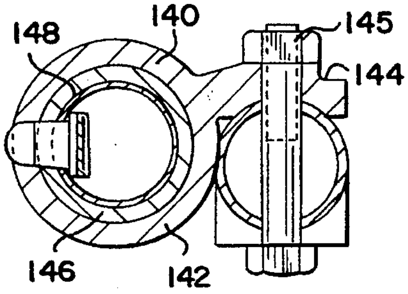

LOW COST WHEELCHAIR

BACKGROUND OF THE INVENTION

This invention relates to manual wheelchairs.

Manual wheelchairs that have typically been sold commercially fall into roughly two different categories: (1) those that are relatively inexpensive and heavy made from welded steel tubular frames and (2) those that are relatively expensive made from lightweight alloys.

The inexpensive variety of wheelchair is typically made from low carbon tubular steel that is welded at many locations, often in or causing the most highly stressed members within the structure. For example, the axle mountings for the large rear wheels of the chair are welded to the frame. Such welds are time-consuming in the manufacturing process, are subject to corrosion in use, and reduce product life. Wheelchairs with welded steel frames are often quite heavy, because such designs typically use telescoping tubular members and fastening systems that add considerable weight to a wheelchair.

The expensive variety of manual wheelchair overcomes some of the deficiencies of the heavier, inexpensive variety with the use of expensive, lightweight alloys. However, those designs do not eliminate costly welds in their manufacturing process.

Welds add cost to either variety of wheelchair since finishing is required for product appearance and market acceptance. For steel wheelchairs, costly chrome plating is the finishing method of choice. For the alloy wheelchairs, polymer-based powder coating is employed.

Welds also add cost to manual wheelchairs since cut-and-weld tubing manufacture requires multiple operations (i.e. cutting, swaging, welding) and components (i.e. a large number of pieces of tubing cut and swaged in different ways).

While some designs (see, e.g. Mattson U.S. Pat. No. 3,814,477) have reduced the number of welds that current conventional designs employ, they do not eliminate them in the highest stress areas of the wheelchair (i.e. the rear-axle mounting). Furthermore, such a wheelchair is not foldable since the rear axle is welded in place between two side frames.

SUMMARY OF THE INVENTION

The wheelchair of this invention has a pair of side frame members, each side frame having a continuous, integral loop with two portions that are joined together proximate to the rear of the wheelchair. At the juncture of each of those two portions, an axle is mounted on which a rear wheel of the wheelchair is mounted. Preferably, the two portions overlap one another, with the axle mounted on the area of overlap.

Most preferably, each wheel axle is mounted between the two overlapping portions, with one of the overlapping portions being flattened.

BRIEF DESCRIPTION OF THE DRAWINGS

FIG. 8 is a perspective view of one embodiment of a front rigging mounting assembly used on the wheelchair of this invention.

FIG. 12 is a perspective view of a fifth embodiment of a front rigging mounting assembly used on the wheelchair of this invention.

FIG. 13 is a cross-section taken along the plane of line XIII—XIII of FIG. 12.

FIG. 14 is a cross-section taken along the plane of line XIV—XIV of FIG. 12.

DETAILED DESCRIPTION OF THE PREFERRED EMBODIMENTS

Figure 1:
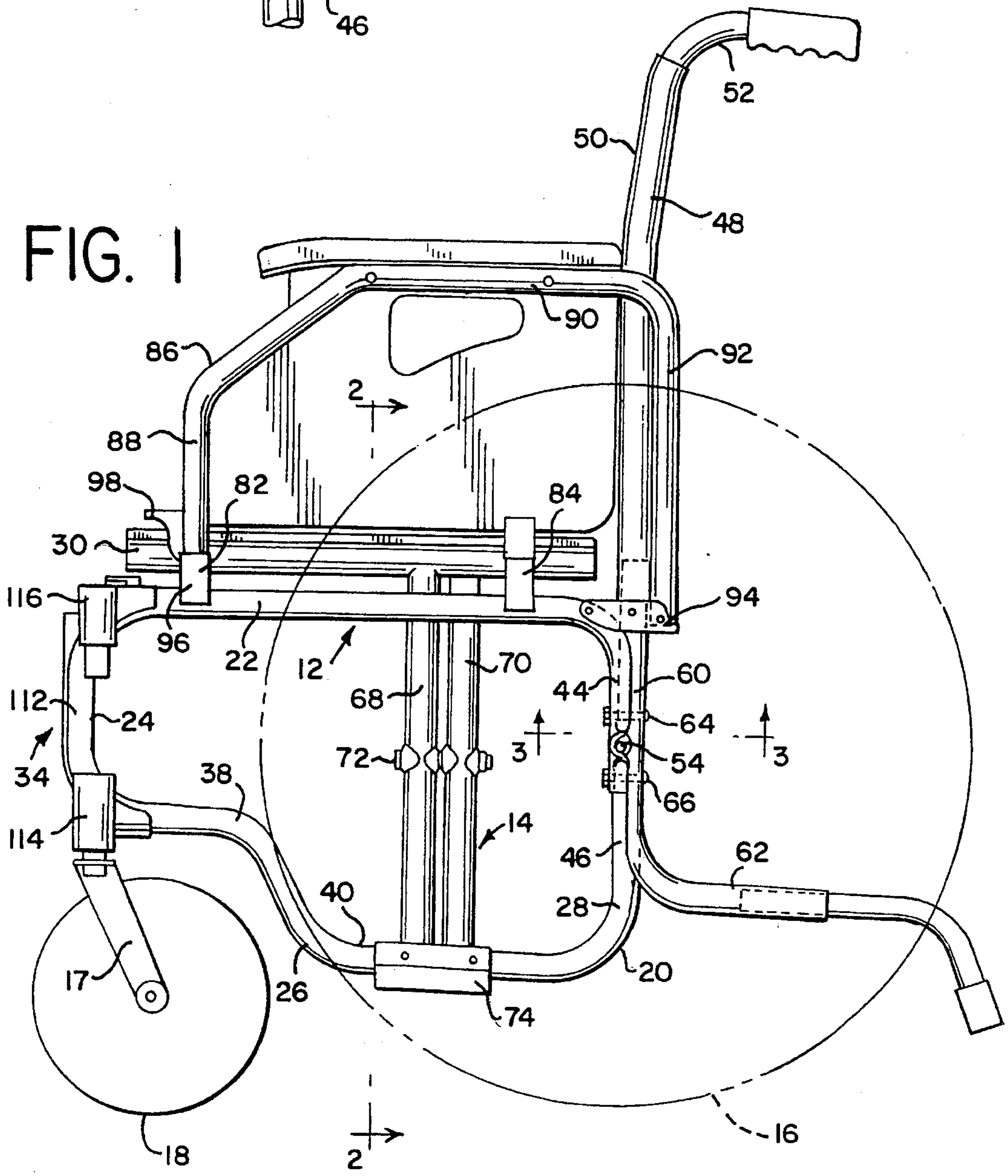
FIG. 1 is a side view, partially in shadow, of a wheelchair according to the present invention.
Figure 2:
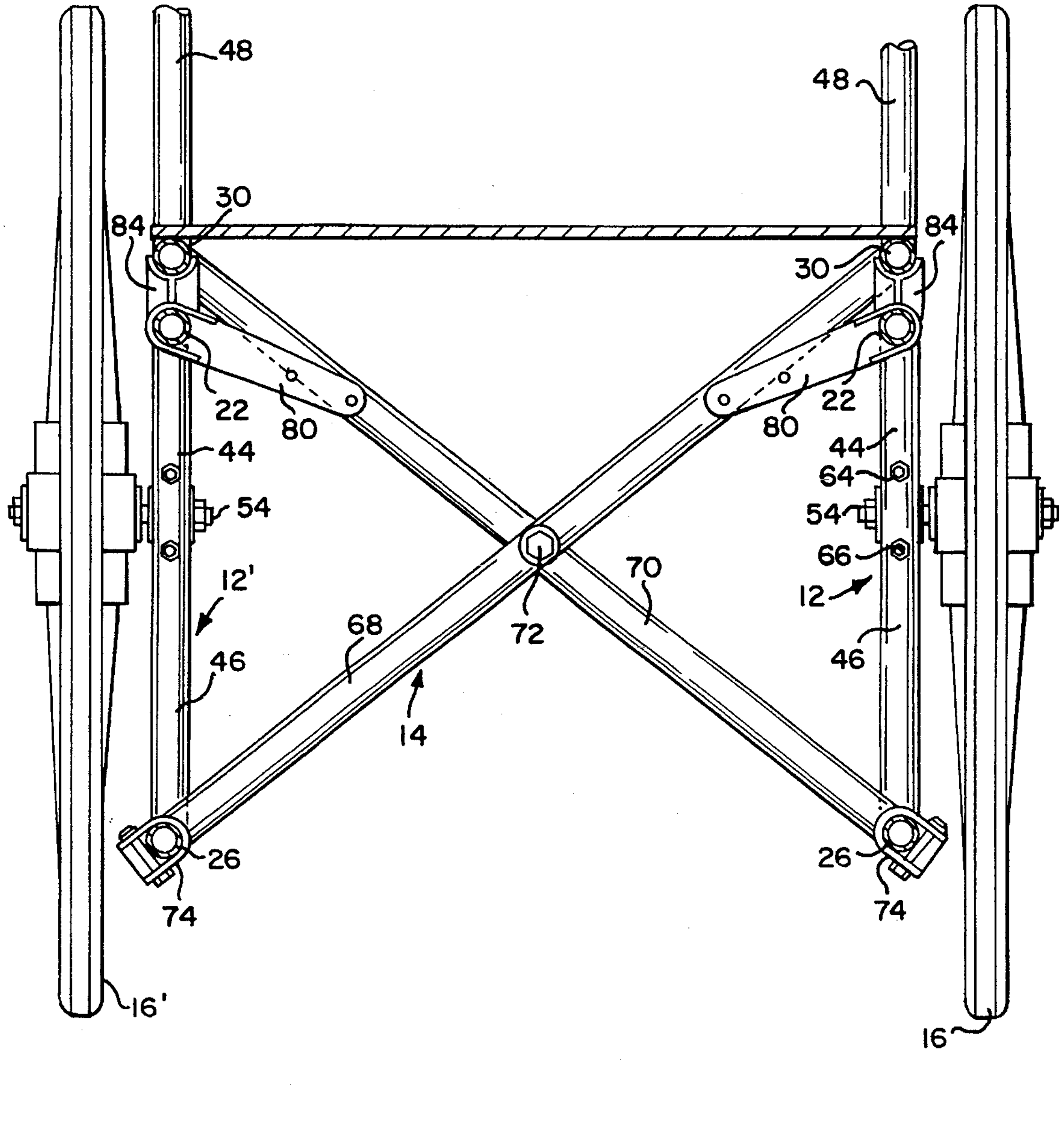
FIG. 2 is a cross-section of the wheelchair of this invention taken along the plane of line II—II of FIG. 1.

The wheelchair 10 (FIGS. 1–2) of this invention includes a pair of side frame members 12, 12' that are joined together by a cross brace assembly 14. Wheelchair 10 is supported by a pair of rear wheels 16, 16' and a pair of front wheels 18, 18'.

Each side frame member 12 (or 12') contains a continuous and integral loop 20 of tubing. Each loop 20 includes a horizontal upper portion 22, a descending front portion 24, a lower portion 26, and a rear portion 28. Each upper portion 22 supports a side rail 30 of a seat 32, when the wheelchair is unfolded. Each front portion 24 supports a front wheel and rigging support assembly 34 that has a front wheel 18 (or 18') at its lower end and the front rigging (i.e. the feet support) 36 (FIG. 8) at its upper end.

Each lower portion 26 of a side frame member 12 (or 12') includes a raised portion 38 adjacent front portion 24, connected to the main portion 40. Raised portion 38 is raised above main portion 40 to allow caster front wheel 18 to pivot freely under raised portion 38, which allows the wheelchair to be turned freely.

Rear portion 28 of side frame member 12 is formed from two overlapping portions. The first overlapping portion 44 is the end of the continuous piece of tubing that curves and descends downwardly from the rear of upper portion. The second overlapping portion 46 is the continuation of lower portion 26 that curves upwardly from the bottom of the wheelchair. Second overlapping portion 46 continues upwardly past the first overlapping portion to become one side support 48 of the backrest 50 of the chair. Side support 48 curves rearwardly to form a handle grip 52, which allows the chair to be pushed.

Thus, each side frame 12 (or 12') is made from a continuous piece of tubing. One end of the tubing is handle grip 52, while the other end of the tubing is first overlapping portion 44. From handle grip 52, the tubing is bent downward to side support 48 which continues downward to second overlapping portion 46 which is bent forward to create lower portion 26. Lower portion 26 is bent upward to create front portion 24, which is bent rearward to form upper portion 22. Upper portion 22 is bent downward to form first overlapping portion 44.

Figure 3:
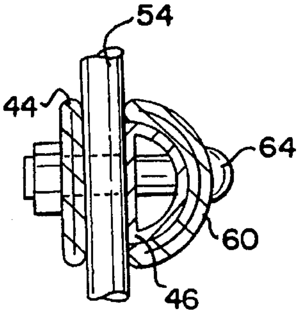
FIG. 3 is a cross-section of the wheelchair of this invention taken along the plane of line III—III of FIG. 1.
Figure 4:
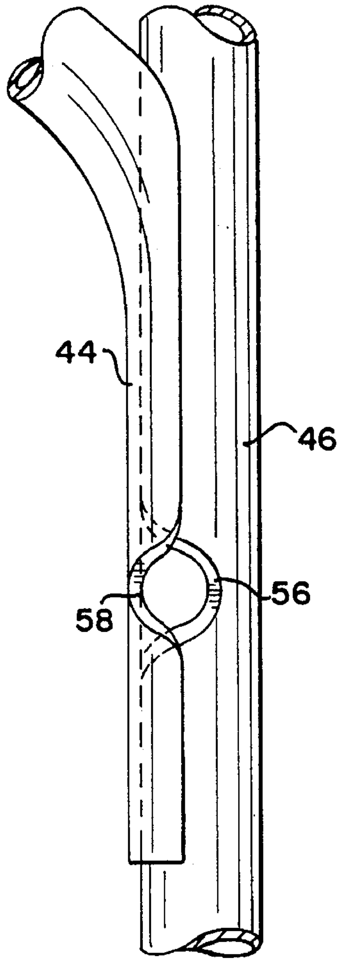
FIG. 4 is a detail view of the area of the wheelchair of this invention where a rear axle is mounted.

First overlapping portion 44 (FIGS. 1, 3 and 4) is flattened to overlay second overlapping portion 46 which generally retains its tubular shape. Captured between the two overlapping portions is one of the two rear axles 54 on which a rear wheel 16 is mounted. Second overlapping portion 46 is swaged to have a semicircular recess 56, while first overlapping portion 44 is swaged to have a semicircular recess 58. Recesses 56 and 58 meet together to form a circular passage that rigidly captures an axle 54. To reinforce the two overlapping portions 44 and 46, a reinforcing member 60 is disposed overlaying portions 44 and 46. Reinforcing member 60 is flattened in the area where it overlays portions 44 and 46. The lower end of reinforcing member is bent rearwardly to provide a curb step member 62 on which the person pushing the wheelchair can step to raise the front of the chair over curbs, steps and other objects.

Two fasteners 64, 66 extend though reinforcing member 60 and overlapping portions 44 and 46 above and below axle 54 to hold axle 54 rigidly in position.

Figure 6:
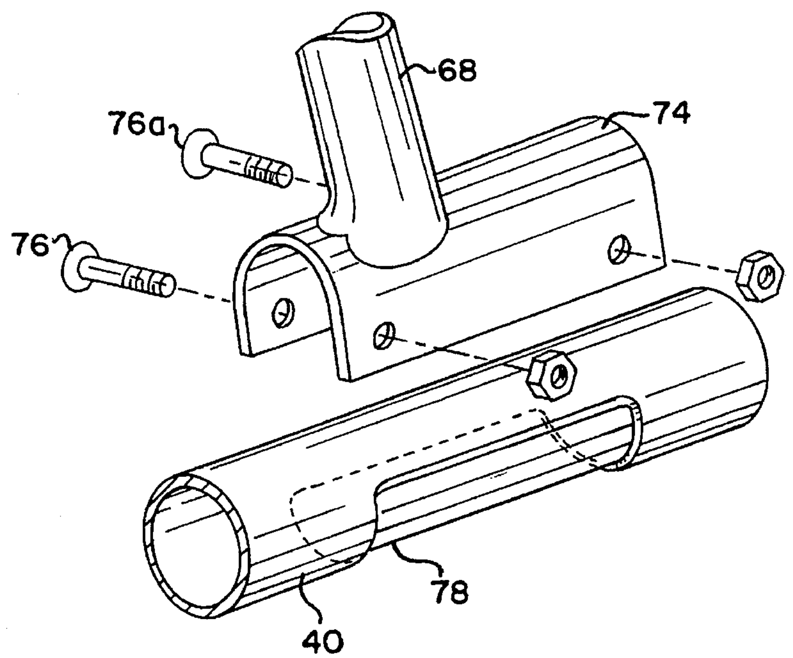
FIG. 6 is an exploded sectional view of the crossbrace hinge used on the wheelchair of this invention.
Figure 5:
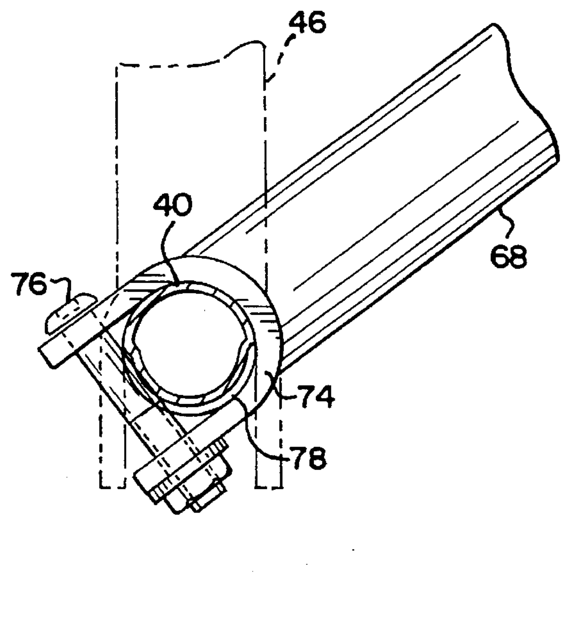
FIG. 5 is a sectional view of the crossbrace hinge used on the wheelchair of this invention.

The two side frame members are connected together by cross brace assembly 14. Cross brace assembly 14 includes two cross braces 68, 70 that are pivotally connected at their middles by a fastener 72 which allows the cross braces to fold when the wheelchair is folded. The lower end of each cross brace 68 (and 70) includes a cross brace hinge 74 (FIGS. 2, 5 and 6) that is pivotally mounted on one of the main portions 40 of lower portion 26 of side frame members 12 (or 12'). Each cross brace hinge 74 is a U-shaped bracket that has two bolts 76, 76*a* that pass though the arms of the "U" to capture tubing 40 within the hinge 74.

Each cross brace hinge 74 is positioned along tubing portion 40 where one swaged arcuate dimple 78 is provided. Each bolt 74, 74*a* rides at one end of the dimple, which prevents the cross brace hinge 74 from sliding laterally along tubing portion 40. As the wheelchair is folded and cross brace hinge 74 is pivoted on tubing portion 40, however, bolts 74, 74*a* slide in dimple 78, maintaining the lateral position of hinges 74 on tubing 40.

The upper ends of each cross brace 68 and 70 terminates in an elongated horizontal seat side rails 30 that support the sides of a flexible, foldable seat 32.

Between fastener 72 and the upper end of each cross brace 68 or 70 is pivotally mounted one end of a short linker arm 80. The other end of each linker arm 80 is pivotally mounted on one of the upper portions 22 of one of the side frame members 12 and 12'. Linker arms 80 allow the wheelchair to fold without the upper half of the wheelchair unfolding uncontrollably. When the wheelchair is unfolded, the linker arms keep the wheelchair from spreading apart.

When the wheelchair is unfolded, the side rails 30 of the seat rest in semicircular cradles 82 and 84 (FIGS. 1 and 2) that are fixedly mounted on each of the upper portions 22 of side frame members 12 and 12'. Each cradle 82 supports the forward end of a side rail 30. Each cradle 84 is spaced from a cradle 82 along member 22 and supports the rear end of a side rail 30.

Figure 7:
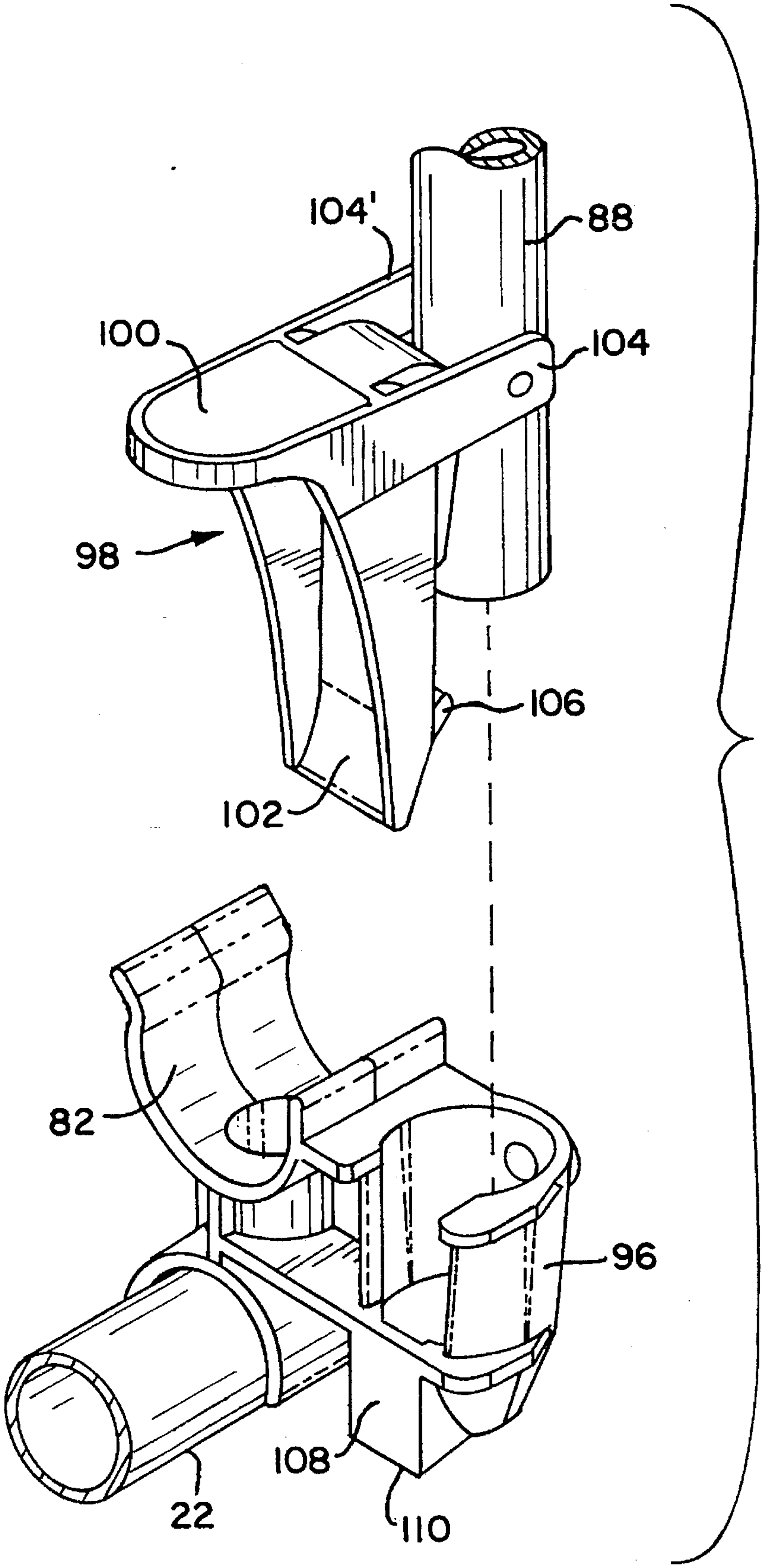
FIG. 7 is an exploded sectional view of the armrest latching mechanism used on the wheelchair of this invention.

Mounted on each side frame is an armrest 86 of conventional construction, except that it is not welded to the wheelchair frame. Each armrest 86 is made from a single piece of tubing that is bent to form a forward vertical portion 88, a central horizontal portion 90, and a rearward vertical portion 92 (see FIGS. 1 and 7). The lower end of the rearward vertical portion 92 is hingedly mounted to a bracket 94 that is mounted near the juncture of portions 22 and 44 of side frame member 12 (or 12').

The lower end of forward vertical portion 88 is removeably mounted in a socket 96 that is integrally molded with cradle 82. Pivotally mounted on the lower end of forward vertical portion 88 is a release latch 98 that includes a handle portion 100 and a catch portion 102. Handle 100 includes two spaced arms 104, 104' that are pivotally mounted on vertical portion 88.

Catch 102 includes a projection 106 that as the armrest 86 is pivoted downwardly (so that vertical portion 88 is received in socket 96), projection 106 is deflected by a ramp 108 on socket 96 until projection 106 catches under the lower edge 110 of ramp 108 to hold armrest 86 in its locked lowered position.

When one wants to raise an armrest 86, handle 100 is pulled upward, which disengages catch 106 from underneath edge 110 and allows the armrest to pivot upwardly around bracket 94.

Each front support assembly 34 (FIGS. 1 and 8) is formed from a channel member 112 that is roughly arcuate in shape. Member 112 is "arcuate" inasmuch as it follows the contour of the front of side frame 12 (or 12' as the case may be). Member 112 is a "channel" since has roughly a semicircular section that allows the tubular frame member 12 (particularly portion 24) to nest within it.

A front wheel mounting bracket 114 is welded to the lower curved end of each channel member 112. A caster front wheel bracket 17 and wheel 18 is mounted on each bracket 114. At the upper end of each channel member 112, a mounting cup 116 is welded. Cup 116 removably receives the upper end of the front rigging 36 (FIG. 8).

Two fastener members (not shown) extend through channel member 112 to fasten it to front portion 24, but the fasteners do not bear any considerable weight or create any regions of particularly high stress in tubing 24. This is because the curved portion between from portion 24 and raised portion 38 of side frame member 12 (and 12') rests within a correspondingly curved portion of the lower end of channel member 112. Thus, the weight of the user carried by the front wheels is supported by the curved lower front end of side frame member 12 (and 12') resting within the curved lower end of member 112. The fasteners, accordingly, do not carry the user's weight to any degree.

Likewise, the curved upper portion of channel member 112 resting on side frame member 12 (or 12' as the case may be) carries the weight of the users legs transmitted to cup 116 by the front rigging 36 that supports the user's legs. The fasteners, accordingly, do not carry much, if at all, of the weight of the user's legs.

Figure 9:
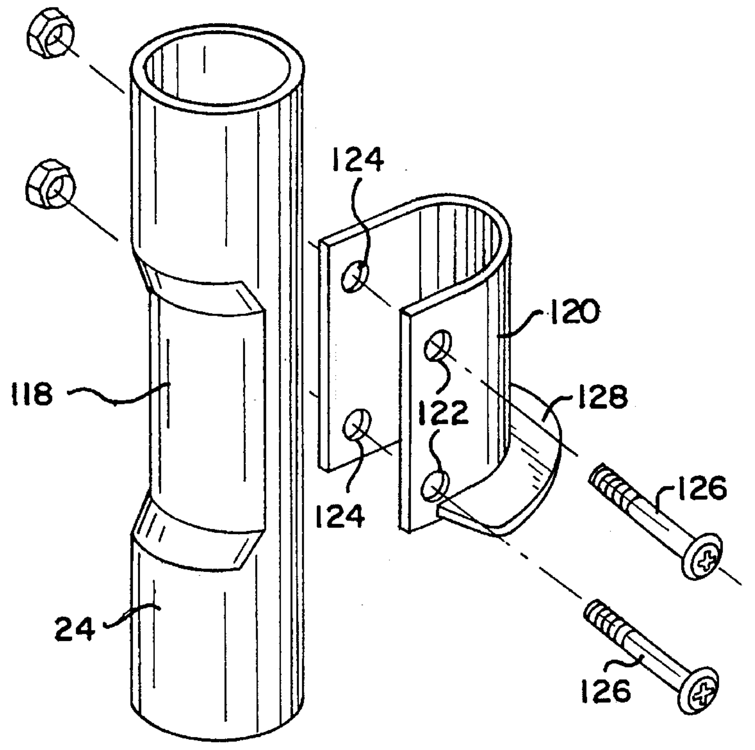
FIG. 9 is a perspective view of a second embodiment of a front rigging mounting assembly used on the wheelchair of this invention.
Figure 10:
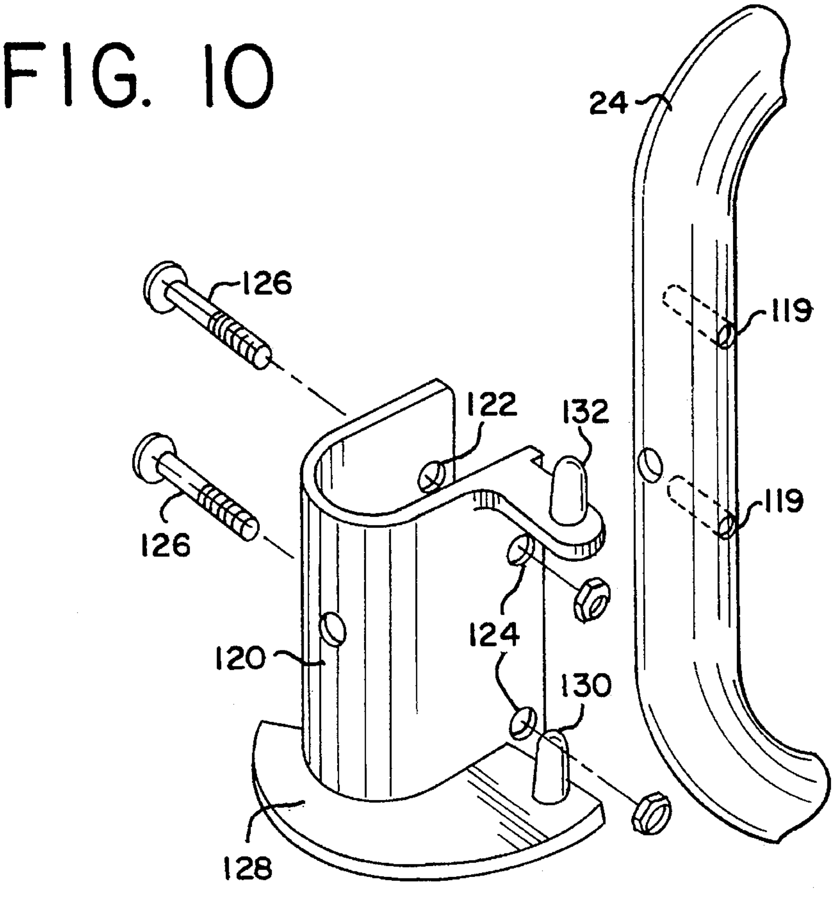
FIG. 10 is a perspective view of a third embodiment of a front rigging mounting assembly used on the wheelchair of this invention.
Figure 11:
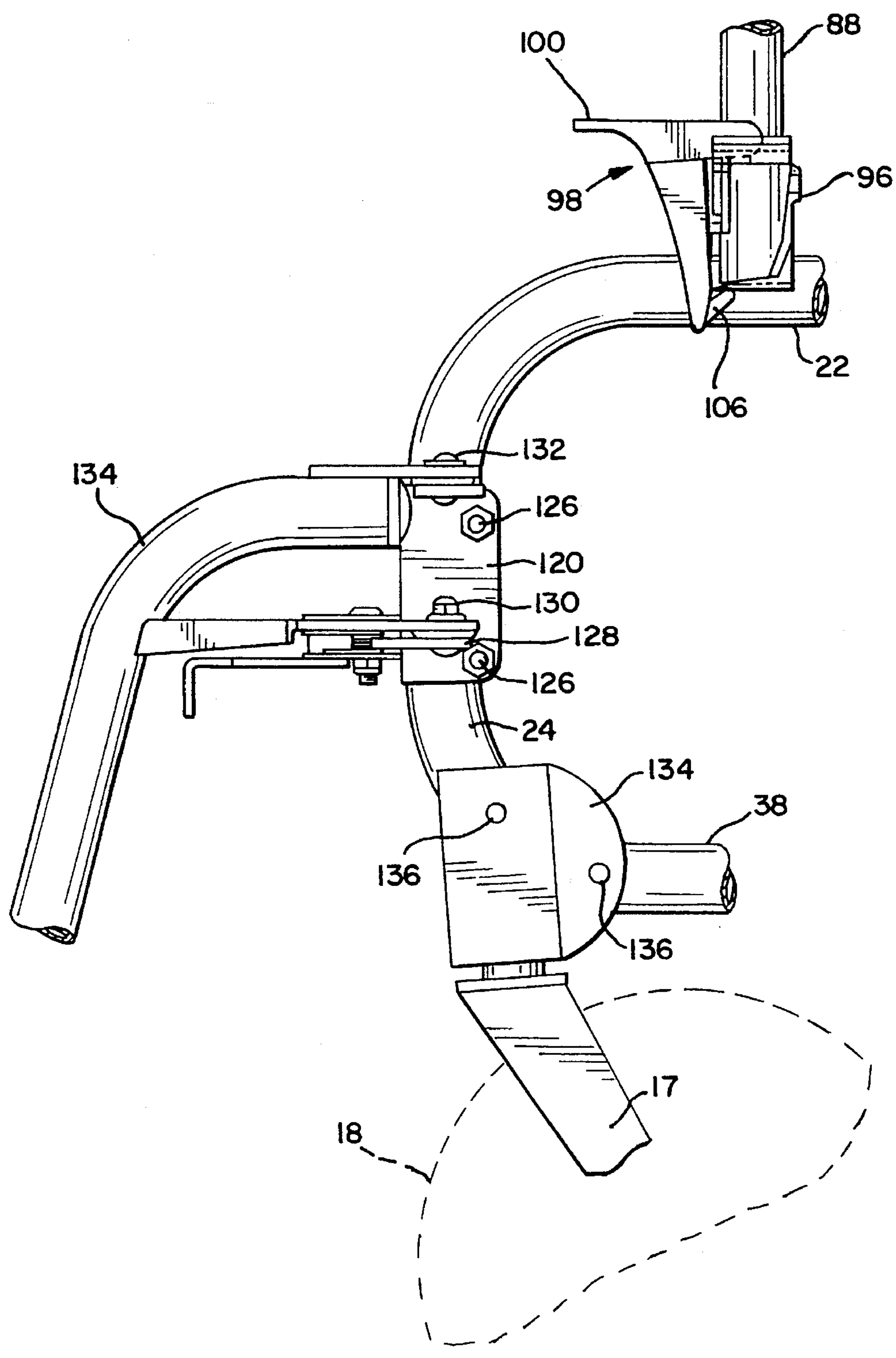
FIG. 11 is a perspective view of a fourth embodiment of a front rigging mounting assembly used on the wheelchair of this invention.

Another embodiment for mounting front rigging on the wheelchair of this invention is shown in FIGS. 9–11. The rear side of the front portion 24 of each side frame member is swaged with a wide recess 118 (FIG. 9) or, alternatively, two holes 119 (FIG. 10) are drilled through tubing portion 24. On the front of each front portion 24 is mounted a U-shaped bracket (also shown in FIG. 10). Bracket 120 includes holes 122, 124 for receiving screws 126. As shown in FIG. 9, screws 126 are captured within recess 118, which prevents bracket 120 from sliding downward on front portion 24. Alternatively, as shown in FIG. 10, screws 126 can pass through holes 119 to hold bracket 120 in position.

Bracket 120 includes a shelf 128 at its lower end on which a lower vertical pin 130 is mounted. An upper vertical pin 132 is mounted on the upper end of bracket 120. The spacing and configuration of shelf 128 and pins 130 and 132 are such as to receive standard front rigging 134 (FIG. 11) for supporting the user's legs.

In the event that a bracket 120 of the type shown in FIGS. 9–11 is employed, the front wheel 18 can be mounted with a separate bracket 134 (FIG. 11) mounted on the lower end of tubing portion 24 with fasteners. In fact, bracket 134 is mounted on the curved bend between tubing portions 24 and 38 such that the screws 136 that mount bracket 134 to the tubing exert a compressive force on the tubing, and will not rip the tubing.

On the lower end of bracket 134 is mounted a castered bracket 17 for a front wheel 18.

Another embodiment for mounting the front rigging to tubing portion 24 is shown in FIGS. 12–14. In that embodiment, a bracket 140 is mounted on tubing portion 24. Bracket 140 includes a tubular socket 142 and an arm 144. Arm 144 is bolted to tubing 24 with bolts 145. Socket 142 receives a sleeve 146, which in turn receives and reinforces the end of the tubing 148 that forms the front rigging (i.e. the leg support).

Sleeve 146 has a flange 150 at its upper end upon which is mounted a spring-biased lever 152. Lever 152 is pivotally mounted by a fastener 154 and biased so that a cam 156 is normally biased against a spring-loaded upper button 158. Upper button is mounted on one leg 160 of a spring 162 contained within tubing 148. Spring 162 also has a second leg 164 that biased the first leg 160 against the inside of tubing 148. Leg 160 further supports a lower button 166.

Button 158 extends through an opening in tubing 148 and rests on flange 150. Button 166 extends through aligned openings in tubing 148, sleeve 146 and socket 142. When lever 152 is pushed inward, cam 156 pushes button 158 inward, which forces arm 160 of spring away from the inside surface of the tubing 148. This causes lower button 166 to retract from its openings, which allows tubing 148 to be rotated relative to or be removed from socket 142. In this manner, the front rigging (not shown) supported on tubing 148 can be pivoted or removed to allow the user egress from the chair, and to allow the chair to be stored.

While several wheelchairs have been described in detail, other chairs will be apparent to those skilled in the art in light of the disclosure above. Such other chairs are considered within the scope of this invention, unless the claims that follow expressly state otherwise.

We claim:

1. A wheelchair comprising:

a. a pair of side frame members, each side frame member being a continuous and integral loop having first and second ends joined together proximate to the rear of the wheelchair;

b. a pair of axles each axle mounted at a juncture of the two ends of a side frame member, wherein the two ends of each side frame member are joined together in an overlapping relationship, and wherein each axle is mounted between the two ends in the area of overlap;

c. a pair of rear wheels, each mounted on one of the axles; and, d. a pair of front wheel assemblies, each front wheel assembly being mounted adjacent the front of the wheelchair on one of the side frame members.

2. The wheelchair of claim 1 wherein the area of overlap is vertically oriented.

3. The wheelchair of claim 1 wherein at least one of the two ends of each side frame member is crimped.

4. The wheelchair of claim 3 wherein each of the side frame members is formed from a piece of tubing.

5. The wheelchair of claim 1 further including a reinforcing member disposed overlaying the area of overlap.

6. The wheelchair of claim 5 wherein the reinforcing member is a flattened tubular member.

7. The wheelchair of claim 1 further including a handle portion extending upwardly from one of the first and second ends on each of the side frame members.

8. The wheelchair of claim 7 wherein each handle portion is continuous and integral with one of the side frame members.

9. The wheelchair of claim 8 wherein each handle portion includes a rearwardly extending horizontal hand grip.

10. A foldable wheelchair comprising:

a. a pair of side frame members, each side frame member being a continuous and integral loop having first and second ends joined together proximate to the rear of the wheelchair;

b. a pair of axles each axle mounted at a juncture of the two ends of a side frame member, wherein the two ends of each side frame member are joined together in an overlapping relationship, and wherein each axle is mounted in the area of overlap;

c. a pair of rear wheels, each mounted on one of the axles;

d. a pair of front wheel assemblies, each front wheel assembly being mounted adjacent the front of the wheelchair on one of the side frame members; and e. a foldable cross brace assembly extending between the side frame members.

11. The foldable wheelchair of claim 10 wherein the cross brace assembly includes a pair of cross braces pivotally connected together at points intermediate their ends, with the lower end of each cross brace pivotally connected to a lower portion of a side frame member, and the upper end of each cross member supporting a seat.

12. The foldable wheelchair of claim 11 further including a pair of linker arms, one end of each linker arm pivotally connected to a cross brace, and the other end of each linker arm pivotally connected to an upper portion of a side frame member.

13. The foldable wheelchair of claim 11 wherein the lower end of each cross brace includes a U-shaped bracket that receives the lower portion of the side frame member, and at least one fastener that extends between the arms of the "U" to capture the lower side frame portion within the bracket.

14. The foldable wheelchair of claim 13 wherein the lower side frame portion of each side frame contains at least one arcuate dimple, and wherein the fastener passes through the dimple to allow pivotal movement of the bracket but to restrain lateral movement of the bracket along the lower portion of the frame member.

15. The foldable wheelchair of claim 11 further including a front channel member overlaying a front portion of each side frame member, the lower end of each channel member supporting a front wheel of the wheelchair.

16. The foldable wheelchair of claim 15 further including two footrest assemblies, each assembly supported by the upper end of each channel member.

17. The foldable wheelchair of claim 16 wherein each channel member and front portion include lower mating curved portions so that the front portion is supported by and within the lower curved portion of the channel member.

18. The foldable wheelchair of claim 17 wherein a front wheel is mounted on the lower curved portion of each channel member.

19. The foldable wheelchair of claim 17 wherein each channel member and front portion include upper mating curved portions so that the upper curved portion of the channel member is supported by the upper curved front portion.

20. The foldable wheelchair of claim 19 wherein each foot rest assembly is mounted on the upper curved portion of the channel member.

21. The wheelchair of claim 31 further comprising hinged armrests mounted on hinges disposed at the rear of the wheelchair.

22. The wheelchair of claim 21 wherein each of the hinged armrests include a latching mechanism at the front of the wheelchair.

23. The wheelchair of claim 22 wherein the latching mechanism includes a socket for receiving the armrest, and a catch for releasably holding the armrest in the socket.

24. The wheelchair of claim 23 wherein the catch includes a handle to release the catch.

25. The wheelchair of claim 24 wherein the socket includes a ramp on which the catch slides as the armrest is being inserted into the socket, and a lower edge under which the catch is received to retain the armrest in the socket.

26. The wheelchair of claim 25 further including a cross-brace assembly extending between the side frame members that includes a pair of rails between which is mounted a foldable seat.

27. The wheelchair of claim 26 further including a plurality of cradles on the side frame members for supporting the rails when the chair is unfolded.

28. The wheelchair of claim 27 wherein at least one of the cradles is integrally formed with one of the sockets for the armrests.

* * * * *